United States Patent [19]

Fujikawa et al.

[11] 3,885,614
[45] May 27, 1975

[54] SAFETY TIRE

[75] Inventors: Akira Fujikawa; Takashi Takusagawa, both of Tokyo, Japan

[73] Assignee: Bridgestone Tire Company Limited, Tokyo, Japan

[22] Filed: Oct. 19, 1973

[21] Appl. No.: 408,017

[30] Foreign Application Priority Data

Oct. 21, 1972 Japan.............................. 47-105693

[52] U.S. Cl.............................. 152/340; 152/361 R
[51] Int. Cl................................................. B60c 5/08
[58] Field of Search........ 152/340, 339, 361 R, 185, 152/187, 158, 400, 399

[56] References Cited
UNITED STATES PATENTS 3,225,811  12/1965  Hawkes............................... 152/340
3,487,870  1/1970  Huber.................................. 152/340
3,512,568  5/1970  Delobelle......................... 152/361 R
3,789,900  2/1974  Verdier............................ 152/361 R

*Primary Examiner*—Robert B. Reeves
*Assistant Examiner*—Thomas E. Kocovsky
*Attorney, Agent, or Firm*—Sughrue, Rothwell, Mion, Zinn & Macpeak

[57] ABSTRACT

A safety tire having an inner tire defining a first tire chamber therein and a tubeless outer tire defining a second tire chamber between the inner and outer tires, which second chamber is isolated from the first chamber. A breaker consisting of rubberized cord plies is disposed on crown portion of the inner tire, so as to produce a sufficient cornering power for running at 100 Km/hour or faster even after breakdown of said outer tire.

8 Claims, 3 Drawing Figures

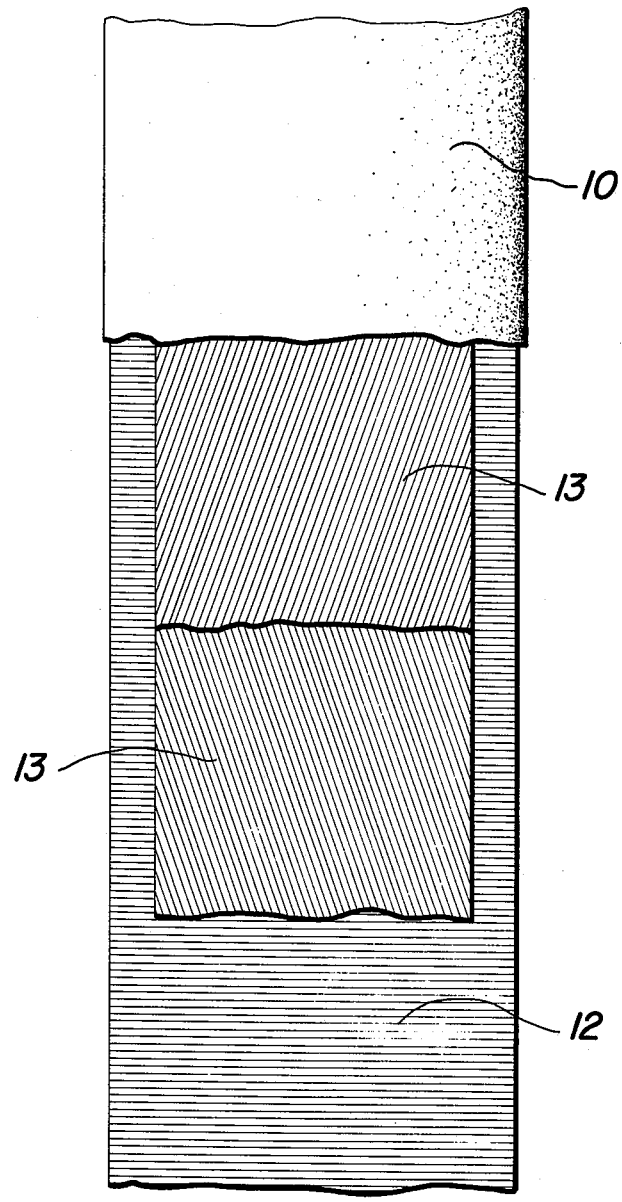
FIG_3

SAFETY TIRE

BACKGROUND OF THE INVENTION

1. Field of the Invention

This invention relates to a safety tire, and more particularly to a safety tire comprising an outer tubeless tire and an inner tire for allowing high speed driving even after breakdown of the outer tire, such as nail-treading or burst.

2. Description of the Prior Art

It is well known that tire punctures and bursts are most common causes of automobile accidents on highways. When an automobile is running at a high speed, e.g., at about 100 Km/hour, if the internal pressure of a tire is suddenly lost by puncture or burst, the driver of the automobile may lose the control of the automobile due to the fact that the pressureless tire cannot produce a sufficient control power for maneuvering the automobile. As a result, collision or turnover of the automobile may be caused, which sometimes leads to a serious traffic accident.

Various types of safety tires have been proposed heretofore: for instance, to increase the thickness of tire tread for preventing a nail from breaking through the tire tread, to dispose a plurality of small metal disks in the tire tread for stopping the nails by the metal disks, and to dispose an inner tire within a conventional pneumatic tire. With the tires thus proposed heretofore, the cornering power of the tire is materially reduced upon puncture or burst, for instance to less than 30 percent of that before the puncture or burst. Such a drastic reduction of the cornering power is found to be one of major causes of automobile accidents on highways.

U.S. Pat. No. 3,126,936, which was patented to Richard Beckadolph on Mar. 31, 1964, teaches the use of a pneumatic tube arranged in the annular chamber of an outer tire body. Although the tire of Beckadolph is intended to increase the lateral stability under normal running conditions, the internal pressure of the entire tire will be lost soon after the tire puncture or tire burst, because the tire puncture or burst results in a virtual communication of the inside space of the pneumatic tube with the outside atmosphere. Consequently, the tire of Beckadolph does not retain a sufficient lateral rigidity at the time of tire puncture or tire burst, which is necessary for ensuring safe driving on highway.

Therefore, an object of the present invention is to provide an improved safety tire, which can be used for high-speed driving on highway even after puncture or burst, so that the aforesaid difficulties of the conventional safety tire may be obviated.

SUMMARY OF THE INVENTION

As a result of years of studies on various factors affecting the performance of a safety tire, the inventors have found out that the following three requirements are essential for high-speed driving (for instance, at 100 Km/hour) of a safety tire after tire puncture or burst: namely, to bear the mechanical load of the automobile, to prevent the influence of the puncture or burst from propagating to the tire inside, and to provide a cornering power which is at least as large as one half of the cornering power just prior to the puncture or burst.

With the present invention, an inner tire with a conventional tire tube is disposed within an outer tire of tubeless type, and two or more breaker plies are disposed on the crown portion of the inner tire. The disposition and the Young's modulus of the breaker cords of the inner tire are such that most nails, which thrust through the outer tire and reach the inner tire breaker, are bent by the breaker plies and prevented from penetrating therethrough. The inner tire breaker also acts to retain more than 50 percent of the cornering power of the sound tire even after the puncture or burst of the outer tire. The inner tire having such breaker plies proved to be strong enough to bear the mechanical load of the automobile after the breakdown of the outer tire, e.g., puncture or burst.

Thus, the dual tire structure of the invention, consisting of the tubeless outer tire and the inner tire with a tire tube and at least two breaker plies, simultaneously fulfills all of the aforesaid three requirements for the desired safety tire.

BRIEF DESCRIPTION OF THE DRAWING

For a better understanding of the invention, reference is made to the accompanying drawing, in which:

FIG. 2 is a graph showing the variation of nail bending rate and retaining factor of cornering power of the safety tire for different breaker cord angles of an inner tire thereof and FIG. 3 shows a top view of a section of the inner tire, partly broken away, to illustrate the breaker ply and carcass cord angles.

DESCRIPTION OF THE PREFERRED EMBODIMENT

Figure 1:
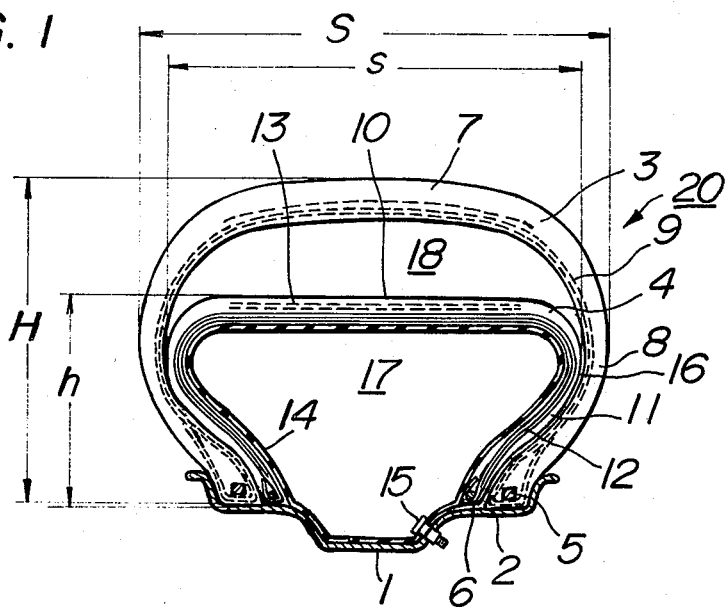
FIG. 1 is a radial sectional view of a safety tire, according to the present invention.

Referring to FIG. 1, a safety tire 20 according to the present invention can be mounted on a metal rim 1. The figure illustrates the tire in a radial cross section under inflated conditions at normal operation pressure. The metal rim 1 has a bead seat 2 for operatively receiving a tubeless outer tire 3 and an inner tire 4 of the safety tire. The inner and outer tires 3 and 4 include paired bead portions 5 and 6, respectively, which are held by the bead seat 2 of the metal rim 1.

The outer tire 3 comprises a crown or tread portion 7 extending along the equatorial periphery of the safety tire 20, a pair of sidewalls 8 extending from the opposing edges of the crown portion 7 to the corresponding beads 5, and a carcass 9 extending across the pair of beads 5 along the inner peripheral surface of the sidewalls 8 and the crown portion 7. Similarly, the inner tire 4 comprises a tread rubber 10 extending along the equatorial periphery of the tire 4, a pair of sidewalls 11 extending from the opposing edges of the tread rubber 10 to the corresponding beads 6, and a carcass 12 extending across the pair of beads 6 along the inner peripheral surface of the sidewalls 11 and the tread rubber 10. In addition, the inner tire 4 includes breaker plies 13 which act to reinforce the tread rubber 10.

A tire tube 14 is disposed in the inner tire 4 so as to define a first tire chamber 17, and a second air chamber 18 is defined between the inside surface of the outer tire 3 and the tread rubber portion 10 of the inner tire 4. A tire valve 15 is mounted on the metal rim 1 in such a manner that compressed air may be selectively delivered into the first and second tire chambers 17 and 18 at rated pneumatic pressures. Small air passages 16 are formed on predetermined portions of the outer peripheral surface of the tire tube 14 and the inner tire 4 in such a manner that the second tire chamber 18 is selectively communicable with the tire valve 15. The tire valve 15 includes an adapter (not shown), which selectively communicates an air source (not shown) to either the first tire chamber 17 or to the second tire chamber 18. It should be noted here that the first and second tire chambers 17 and 18 are completely isolated from each other under any operating conditions, as far as the compressed air is concerned.

The inner tire 4 is a kind of radial tire, in that it comprises carcass cords which are disposed substantially at right angles to the equatorial direction of the inner tire, as shown in FIG. 3. The carcass cords may be, for instance, disposed in the form of two rubberized layers.

With the safety tire of the present invention, the breaker plies 13 in the tread rubber 10 of the inner tire 4 play a critical role. In the preferred embodiment, as illustrated in FIG. 1, two breaker plies 13 are embedded in the tread rubber 10, and each breaker ply 13 comprises rubberized parallel cord layer consisting of inextensible cords with a Young's modulus of not smaller than $1.0 \times 10^5$ Kg/cm². The cords of the two breaker plies are disposed in symmetry with each other relative to the equatorial direction of the inner tire at an angle of 10° to 30° from the equator of the inner tire, as shown in FIG. 3. The inventors have found that at least two such breaker plies 13 are necessary for achieving the desired cornering power when the outer tire 3 is punctured, burst, or otherwise broken down and the pneumatic pressure of the second tire chamber 18 is lost.

The width of the breaker consisting of the overlaid two or more breaker plies 13, taken in parallel to axis of rotation of the tire, must be one half of, preferably the same as, the tread width of the outer tire 3. Thus, the breaker of the inner tire 4 assumes a substantially cylindrical shape about the axis of rotation of the safety tire. The tread rubber 10 may be made of the same rubber material as that constituting the sidwalls 11, which rubber material has a Shore A hardness suitable for the tread rubber of a regular pneumatic tire. Cords for the carcass 12 of the inner tire 4 may be made of nylon, rayon, polyester, metal, or other suitable fibers. The angular disposition of the carcass cords and the number of carcass plies to be overlaid can be suitably selected, depending on the size of the outer tire 3 and the intended use of the safety tire thus formed.

The inventors' test results indicate that the Young's modulus and the disposition of the reinforcing members, i.e. the breaker plies 13, of the inner tire play a critical role in the performance of the safety tire. In order to retain the desired high cornering power after breakdown of the outer tire, the cords of the breaker plies 13 of the inner tire 4 should be $1.0 \times 10^5$ Kg/cm² or larger and should be disposed at an angle of 10° to 30°, preferably about 20°, relative to the tire equator as shown in FIG. 3. It is not desirable to use a large number of metal cords in the breaker 13, because it is detrimental to other performance characteristics of the safety tire. It is preferable to use as many cords in the breaker ply 13 as possible per unit width thereof, taken in parallel to the axis of rotation of the tire, provided that the large number of cords are all securely bonded to the tread rubber 10 of the inner tire. Preferably, the breaker plies 13 extend over the full width of the crown portion of the inner tire 4 substantially in parallel to the axis of rotation of the safety tire, because the breaker plies 13 thus disposed maximize the lateral rigidity of the tire. The tread rubber 10 of the inner tire 4 is preferably made of a hard rubber, for instance, a hard rubber with a Shore A hardness of not smaller than 40°, which is harder than inner lining of the outer tire 3.

When the safety tire 20 is inflated, the outer surface of the side rubber 11 of the inner tire 4 is located in the close vicinity of the inner surface of the sidewall 8 of the outer tire 3. In the preferred embodiment, as illustrated in FIG. 1, a large part of the sidewall 11 of the inner tire 4 is kept in contact with the sidewall 8 of the outer tire 3. In this case, a suitable lubricant, e.g., silicone oil, is applied to the interface between the sidewall 11 and the sidewall 8, so as to prevent heat generation by friction thereat.

Preferably, the cross sectional shape of the inner tire 4 should satisfy the following conditions, for optimizing the performance characteristics of the safety tire 20.

$$0.65 \frac{H}{S} < \frac{h}{s} < 0.9 \frac{H}{S} \tag{1}$$

Here;
H: height of the outer tire 3,
S: width of the outer tire 3,
h: height of the inner tire 4,
s: width of the inner tire 4.

The heights and widths H, h, S, and s of the outer and inner tires 3 and 4 are illustrated in FIG. 1. It should be noted that the relations of the last mentioned inequality (1) is preferable but not restrictive to the present invention.

Bead cores consisting of metal wires are disposed in the bead portions 6 of the inner tire 4, and the shape of the bead portions 6 are so formed that, upon inflation, the bead portions 6 are securely held by the bead seat 2 of the metal rim 1. Such bead portions 6 also act to maintain firm engagement with the bead seat 2 even after the breakdown of the outer tire 3 and the loss of the pressure from the second tire chamber 18, so as to retain the lateral rigidity of the safety tire 20.

Tests were made on nail treading by pneumatic safety tire of the invention. The following table shows the type and number of nails which were trodden by tires of taxis in Tokyo, based on the examination of discarded tires.

| Type of nail | Number of nails trodden | Percentage (%) |
| --- | --- | --- |
| Nails of 30 mm length | 109 | 62.3 |
| Nails of 45 mm length | 26 | 14.9 |
| Nails of 60 mm length | 24 | 13.7 |
| Nails of 90 mm length | 2 | 1.1 |
| Nails of not shorter than 150 mm | 1 | 0.6 |
| Concrete nails and nails for galvanized iron sheets | 6 | 3.4 |
| Other nails | 7 | 4.0 |
| Total | 175 | 100.0 |

As apparent from the table, the possibility of treading nails increases as the nail length decreases. In fact, over 77 percent of all the nails found in the discarded tires as trodden thereby were 45 mm or shorter. For the tests, nails of the type of the aforesaid table were spread on road surface, and test safety tires of dual structures, as shown in FIG. 1, were driven thereon.

Generally, the pointed ends of nails lie horizontally on road surface while keeping the nail heads substantially vertically. As the tire tread the nail heads, the pointed ends of the nails tend to rise vertically, and the nails of 45 mm length or shorter may thrust into the tire at right angles to the surface of the tire crown portion, i.e., toward the axis of rotation of the tire. On the other hand, nails which are longer than 45 mm only obliquely engage the outer peripheral surface of the safety tire, so that such long nails seldom thrust into the tire. Even if such long nails thrust into the tire, the breaker layers 13 of the tread rubber 10 of the inner tire 4 act to bend the thrusting tips of the long nails, and the long nails seldom breakthrough the tread rubber 10 of the inner tire 4. Nevertheless, provision of a sizeable space between the inner tire 4 and the outer tire 3 will reduce the risk of simultaneously breaking through the inner and outer tires by a long nail.

On the other hand, from the standpoint of cornering power of the safety tire under normal running conditions with sound inner and outer tires, it is preferable to dispose the tread rubber 10 of the inner tire 4 as close to the crown portion of the outer tire 3 as possible. With a preferred embodiment of the invention, when the tire is loaded, the height H of the outer tire 3, as shown in FIG. 1, may be reduced to H' (not shown) at road-contacting portion thereof. Under such loaded conditions, the difference (H'-h) between the heights of the outer and inner tires 3 and 4 is preferably kept to be about 40 mm. When the differential height (H'-h) is about 40 mm, a spacing is provided between the inner and outer tires, and yet a high cornering power is ensured while materially reducing the risk of simultaneously breaking through both the inner and outer tires with a nail of 45 mm length or shorter.

As long as the outer tire 3 is sound, the inner tire acts to prevent total failure of the safety tire by preventing nails or the like from simultaneous breakthrough across the inner and outer breakers. To this end, the tread rubber 10 of the inner tire 4 has breaker layers 13 embedded therein, so as to bend nails reaching there and to inhibit them from thrusting into the inner tire 4. Once the outer tire 3 is broken down, the inner tire 4 is required to fulfill all the functions which are necessary for regular pneumatic tires. To meet such requirements, the inner tire 4 and the breaker plies 13 should be constructed in line with the following principles.

1. From the standpoint of providing a high resistance against the nail thrust into the inner tire and producing a large cornering power, the cords of the breaker plies 13 should be disposed at a small angle relative to the equatorial direction of the inner tire 4. On the other hand, to bend the thrusted tip of nails, the cords of the breaker plies should be disposed almost at right angles to the equatorial direction of the inner tire 4. In order to meet the two incompatible requirements on the cord angles of the breaker plies 13, the inventors have found out that a cord angle of 10° to 30°, preferably about 20°, is suitable for the purpose of the invention.

2. The cords for the breaker plies 13 should be inextensible and should have a Young's modulus of $1.0 \times 10^5$ Kg/cm² or larger, because extensible cords and with a Young's modulus of smaller than $1.0 \times 10^5$ Kg/cm² cannot produce a high rigidity of the tread rubber 10 which is necessary for the desired cornering power. It is, however, undesirable to use a large number of metal wires in the breaker plies 13, because the safety tire may become excessively heavy.

3. The width of the breaker plies 13, as taken in parallel to the axis of rotation of the tire, should be substantially the same as the tread width of the outer tire 3. Preferably, the breaker plies 13 are so disposed as to form a substantially cylinder about the axis of rotation of the safety tire, and the width of the breaker plies is wider than that of the tread portion of the outer tire 3.

4. Preferably, the cross sectional shape of the inner tire should satisfy the relationship of the inequality (1), namely, $$0.65 \frac{H}{S} < \frac{h}{s} < 0.9 \frac{H}{S}$$

The relationship of the inequality (1) is, however, not restrictive to the invention.

5. The tread rubber 10 of the inner tire 4 should be made of a hard rubber with a Shore A hardness of not smaller than 40°, preferably a rubber harder than the inner lining of the outer tire 3.

Figure 2:
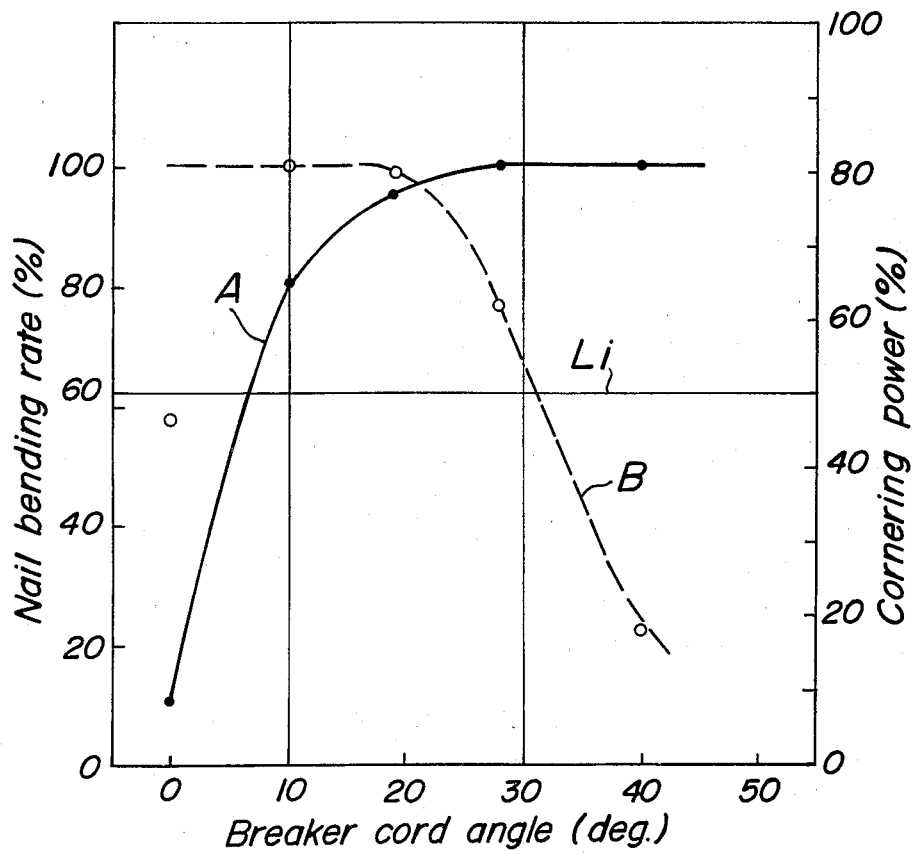

Tests were made to determine the variation of the nail bending rate and retaining factor of the cornering power for different values of the cord angle of the breaker plies 13 of the inner tire 4, by using sample tires of Example to be described hereinafter. The result is shown in FIG. 2, in which the abscissa represents the cord angle of the breaker plies 13, relative to the equatorial direction of the inner tire 4. The left-hand side ordinate represents the nail bending rate, which will be described hereinafter. The right-hand side ordinate represents the retaining factor of the cornering power in percentage: namely, the cornering power of the safety tire after breakdown of the outer tire, in percentage based on the cornering power of the safety tire before the breakdown of the outer tire thereof.

To determine the nail bending rate, a plurality of 45 mm long nails were thrusted into the outer tire 3 of a test safety tire 20, as shown in FIG. 1, along the equator of the outer tire at intervals of 50 mm, and the pneumatic pressure of the tire space 18 was removed. The test tire with nails thrusted therein was placed on an asphalt coated movable platform with a load of 330 Kg applied to the test tire, so as to simulate the engagement of the tire with road surface. The platform was then moved slowly so as to cause the test tire to make two revolutions. The pneumatic pressure in the inner tire 4 was 2.5 Kg/cm². Upon completion of the two revolutions, the test tire was disassembled to check the conditions of the nails. The nail bending rate was determined, based on the following equation.

$$\text{Nail bending rate } (\%) = \frac{\text{Number of nails bent}}{\text{Number of nails thrusted}} \times 100$$

The result of the nail bending test is shown by the curve A of FIG. 2. As apparent from the curve, when the cord angle of the breaker plies 13 in the inner tire 4 is larger than 30°, all the nails were bent as soon as reaching the breaker plies. When the cord angle was reduced to 10° to 20°, some of the nails thrusted were bent but some other nails were partially thrusted into the inner tire without reaching the tire tube 14. When the cord angle was 0°, 90 percent of the nails thrusted into the outer tire 3 were caused to thrust into the inner tire 4 and the tire tube 14, too. The thrusting into the tire tube 14 means the inner tire puncture. The nail bending rate varied for different cord angles of the breaker plies, as shown by the curve A. Thus, the cord angle of 10° to 30° is effective in preventing the puncture of the inner tire 4 even when nails thrust through the outer tire 3.

Prior to the nail bending tests, the retaining factor of the cornering power in the safety of the invention was examined by using the same test safety tires. More particularly, the cornering power of the test safety tire after breakdown of the outer tire was measured and expressed in percentage of the cornering power of the test safety tire before the breakdown of the outer tire. The retaining factor was measured for different cord angles of the breaker plies 13. The result is represented by the curve B of FIG. 2. As apparent from the curve B, when the cord angle of the breaker plies 13 is less than 20°, about 80 percent of the cornering power of the sound safety tire prior to the breakdown of the outer tire 3 is retained even after the breakdown of the outer tire 3. The retaining factor is reduced as the cord angle of the breaker plies 13 increases, and when the cord angle is 40°, the cornering power of the safety tire is reduced to 20 percent of that prior to the breakdown of the outer tire 3.

In FIG. 2, line Li represents a critical level of the retaining factor, which was experimentally determined. If the retaining factor is less than the critical level of 50 percent, i.e., if the cornering power is suddenly reduced to less than 50 percent of that of the sound tire, a driver driving at a speed of faster than 100 Km/hour by using an automobile equipped with such tires may lose the control of the automobile. Even if the automobile speed is not so high as 100 Km/hour, it may become very difficult to ensure reliable automobile movement in response to quick operation of steering handle.

(It should noted here that the measured value of the retaining factor for the case of the cord angle 0° is less than 50 percent. This is because the fact that breaker plies with the cord angle 0° are difficult to make and that, in the case of the test safety tire, effective width of the breaker plies was reduced due to the difficulty in the manufacture thereof.)

Therefore, the cord angle of the breaker plies 13 to be used in the safety tire according to the present invention is selected to be 10° to 30°, based on the aforesaid test results: namely, for simultaneously fulfilling the requirement of preventing the breakdown of both the outer and inner tires 3 and 4 at a time and the other requirement of retaining a high cornering power even after the breakdown of the outer tire 3.

To facilitate the understanding of the invention, numerical examples of different parts of the safety tire will now be described, but such examples should be understood as descriptive and not as restrictive.

EXAMPLE

Samples of safety tire according to the present invention were made by using outer tubless tires 3 of size BR 60 SR 14. The tubeless tire included two rubberized carcass plies consisting of rayon cords, each cord having two 1650 denier strands, which rayon cords were disposed at 90° relative to the equatorial direction of the tubeless tire. The edge portions of the carcass plies were turned around so as to enclose bead wires in the turned around portions of the carcass. Four rubberized breaker plies were embedded in the tread 7 of the outer tire 3, which breaker plies consisted of rayon cords, each cord having three 1650 denier strands. The rayon cords of the breaker plies in the tread 7 of the outer tire 3 were disposed in a symmetrical fashion, relative to the equatorial direction of the outer tire 3, with a cord angle of 15° relative to the equatorial direction. The breaker plies were covered with thread rubber. Such structure of the tubeless tire is known.

The sample safety tire had an inner tire 4 including two rubberized carcass plies consisting of nylon cords, each cord having two 840 denier strands. The cord angle of the carcass plies of the inner tire 4 was the same as that of the carcass plies of the outer tire 3, and the edge portions of the inner tire carcass plies were turned around so as to enclose bead wires of the inner tire. Three breaker plies were disposed on the outer periphery of the tread portion of the inner tire carcass plies: namely, two rubberized breaker plies 13 consisting of rayon cords, each cord having three 1650 denier strands, and one steel cord breaker ply which was commonly used in passenger car tires. A tread rubber 10 was overlaid on the outer surface of the breaker plies 13. The steel cord breaker ply was disposed on the outer surface of the two rayon cord breaker plies which were directly mounted on the carcass plies. The cords of the breaker plies were disposed at an angle of 20°, relative to the equatorial direction of the inner tire, in such a manner that the cords of the adjacent breaker plies crossed each other.

The breaker plies 13 of the inner tire 4 were as wide as the breaker plies of the outer tire 3, and the breaker consisting of the three plies 13 was formed in a cylindrical shape about the axis of rotation of the inner tire 4. When the safety tire with such inner and outer tires 3 and 4 was properly inflated, the inner tire sidewall 11 engaged the outer tire sidewall 8 at about inner one third of the height $h$ of the inner tire 4.

Inflation pressure of the tire chamber 17 in the inner tire 4 was designed to be 2.5 Kg/cm$^2$, and the other tire chamber 18 between the inner and outer tires 4 and 3 was designed to be 2.0 Kg/cm$^2$. When the tire was inflated at such pressure, the outer surface of the widest portion of the inner tire 4 was spaced from the facing inner surface of the sidewall 8 of the outer tire 3 by about 5 mm. When a static load of 400 Kg was applied to the inflated test safety tire at the rated pressure, a spacing of 10 mm to 15 mm was provided between the inner and outer tires 4 and 3, as measured radially relative to the axis of rotation of the safety tire.

The cornering power of the last mentioned test safety tire was measured under the conditions of 2.0 Kg/cm$^2$ in the tire chamber 18, 2.5 Kg/cm$^2$ in the tire chamber 17, and a load of 330 Kg. Cornering power of the same tire was measured under similar conditions, except that the inner pressure of the tire chamber 18 was released due to the breakdown of the outer tire 3. It was proved that 80 percent of the cornering power of the sound safety tire can be retained even after the breakdown of the outer tire 3 thereof. A field test was carried out by mounting the test safety tire on an automobile and running the automobile at a speed of faster than 100 Km/hour on a test road. While driving at such a high speed, one of the safety tires on the front wheels was suddenly punctured at the outer tire 3 thereof. Practically, the test driver did not notice the puncture, and he could keep the automobile under control at will while quickly turning the steering wheel even after the puncture. Furthermore, it was proved by tests that the safety tire could be run over several hundreds of kilometers at about 100 Km/hour.

The test safety tire, according to the present invention, was made for passenger cars, but it is also possible to manufacture the safety tire of the invention for small and large trucks and other heavy vehicles.

We claim:

1. A pneumatic safety tire comprising an outer tubeless tire having a tread and a pair of sidewalls extending from opposing edges of the tread to corresponding tire beads; an inner tire disposed within the outer tire and having a tire tube disposed therein, said inner and outer tires defining first and second tire chambers isolated from each other, respectively, said inner tire having a pair of annular beads, a carcass including at least one reinforcing cord layer and extending across the pair of beads while turning around the opposing edges of the carcass about the beads so as to secure the carcass to the beads, a breaker disposed on the outer surface of the carcass at a crown portion thereof, and a layer of tread rubber overlying the breaker, said breaker including at least two reinforcing plies made of cords each having a Young's modulus of not smaller than $1.0 \times 10^5$ Kg/cm$^2$, said cords of the breaker reinforcing plies being disposed at an angle of 10° to 30° relative to the equatorial direction of the inner tire, said breaker of the inner tire being of cylindrical shape about the axis of rotation of the safety tire, the width of said breaker in parallel to the axis of rotation of the tire being substantially as wide as the tread of said outer tire; and a tire valve means selectively communicating said first and second tire chambers to the outside of the safety tire.

2. A safety tire according to claim 1, wherein said tread rubber of said inner tire consists of a rubber having a Shore A hardness of not smaller than 40°.

3. A safety tire according to claim 1, wherein cross sectional height H and width S of the outer tire satisfy the following relation with cross sectional height $h$ and width $s$ of the inner tire, $$0.65 \frac{H}{S} < \frac{h}{s} < 0.9 \frac{H}{S}.$$

4. A safety tire according to claim 1, wherein said inner tire and said tire tube of said inner tire have grooves formed on outer peripheral surface thereof so as to extend from said tire valve to said second tire chamber.

5. A safety tire according to claim 1, wherein said carcass of said inner tire includes two rubberized plies of nylon cords, which nylon cords are disposed at about 90° relative to the tire equatorial direction, and said breaker of said inner tire includes two rubberized nylon cord plies and one steel cord ply, cords of the three breaker plies of the inner tire being disposed at 20° relative to the tire equatorial direction.

6. A safety tire according to claim 1, wherein said cords of the reinforcing plies of the inner tire breaker are disposed at 20° relative to the tire equatorial direction, while slanting cords of different inner tire breaker plies to different sides of equator of the inner tire breaker.

7. A safety tire according to claim 1, wherein said outer tubeless tire has an inner rubber lining disposed on the inner surface thereof, and said tread rubber of said inner tire has a hardness which is the same as that of said rubber lining of said outer tire.

8. A safety tire according to claim 1, wherein said inner tire has outer surface thereof kept in contact with inner surface of said outer tire at about one third of inner tire section height, taken from the beads of the inner tire in radial directions emanating from the axis of rotation of the safety tire.

* * * * *